(12) United States Patent
Meyer et al.

(10) Patent No.: US 10,048,082 B2
(45) Date of Patent: Aug. 14, 2018

(54) ROUTE AND MODEL BASED ENERGY ESTIMATION

(71) Applicant: Ford Global Technologies, LLC, Dearborn, MI (US)

(72) Inventors: Jason Meyer, Canton, MI (US); Fling Finn Tseng, Ann Arbor, MI (US); Johannes Geir Kristinsson, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 73 days.

(21) Appl. No.: 14/474,072

(22) Filed: Aug. 29, 2014

(65) Prior Publication Data

US 2016/0061616 A1    Mar. 3, 2016

(51) Int. Cl.
G01C 21/26    (2006.01)
G01C 21/34    (2006.01)

(52) U.S. Cl.
CPC .............................. *G01C 21/3469* (2013.01)

(58) Field of Classification Search
None
See application file for complete search history.

(56) References Cited

U.S. PATENT DOCUMENTS

| 8,527,122 | B2 | 9/2013 | Yamada |
| 8,554,473 | B2 | 10/2013 | Arcot et al. |
| 8,594,918 | B2 | 11/2013 | Meyer-Ebeling |
| 8,838,318 | B2 | 9/2014 | Segawa |
| 9,014,959 | B2 | 4/2015 | Kanno |
| 9,079,507 | B2 | 7/2015 | Smith |
| 9,132,746 | B2 | 9/2015 | Enomoto |
| 9,139,095 | B2 | 9/2015 | Kim |
| 2008/0221787 | A1 | 9/2008 | Vavrus |
| 2010/0049397 | A1 | 2/2010 | Liu et al. |
| 2011/0238457 | A1 | 9/2011 | Mason et al. |
| 2012/0004838 | A1 | 1/2012 | Lee et al. |
| 2012/0143413 | A1 | 6/2012 | Cho et al. |
| 2012/0176231 | A1 | 7/2012 | Skaff et al. |
| 2012/0179395 | A1 | 7/2012 | Gilman et al. |
| 2012/0232783 | A1 | 9/2012 | Calkins et al. |

(Continued)

FOREIGN PATENT DOCUMENTS

| EP | 2504663 | 10/2012 |
| JP | 2009/067350 | 4/2009 |
| KR | 20130063371 A | 6/2013 |

OTHER PUBLICATIONS

*The Impact of Stopping on Fuel Consumption*, Victor Miller, Nov. 19, 2011.

(Continued)

*Primary Examiner* — Rami Khatib
(74) *Attorney, Agent, or Firm* — James P. Muraff; Neal, Gerber & Eisenberg LLP (57) ABSTRACT

Described herein is a route and model based energy estimation system and methods therein for predicting an energy consumption of a vehicle for a selected road segment. The predicted energy consumption may be generated for the vehicle based on information specifically related to the vehicle, such as historical energy consumption information for the vehicle, external information that may affect energy consumption by the vehicle, vehicle information, and/or selected road segment information.

17 Claims, 5 Drawing Sheets

(56) References Cited

U.S. PATENT DOCUMENTS

| | | | |
|---|---|---|---|
| 2013/0046428 A1* | 2/2013 | Jordan | B60L 1/06 701/22 |
| 2013/0073113 A1 | 3/2013 | Wang | |
| 2013/0079962 A1 | 3/2013 | Ishikawa | |
| 2013/0116868 A1* | 5/2013 | Erko | B60W 10/26 701/22 |
| 2013/0151046 A1* | 6/2013 | Choi | G08G 1/096838 701/22 |
| 2013/0151056 A1 | 6/2013 | Nakano | |
| 2013/0238189 A1* | 9/2013 | Michaelis | B60Q 9/00 701/36 |
| 2013/0253740 A1 | 9/2013 | Kim | |
| 2013/0311016 A1 | 11/2013 | Kim | |
| 2013/0325335 A1 | 12/2013 | Kee et al. | |
| 2013/0332013 A1* | 12/2013 | Malone | B60H 1/004 701/22 |
| 2014/0025255 A1 | 1/2014 | Zhang | |
| 2014/0046595 A1 | 2/2014 | Segawa et al. | |
| 2014/0143002 A1 | 5/2014 | Aisu | |
| 2015/0183293 A1* | 7/2015 | Kim | B60H 1/00735 165/202 |

OTHER PUBLICATIONS

*Estimating an Electric Vehicle's Distance to Empty Using Both Past and Future Route Information, Lennon Rodgers*, DETC2013-12880, pp. 1-9.

\* cited by examiner

ROUTE AND MODEL BASED ENERGY ESTIMATION

TECHNICAL FIELD

This disclosure generally relates to a route and model based energy estimation system, apparatus, method, and process. More particularly, the disclosure describes a route and model based energy estimation system, apparatus, method, and process for predicting the energy consumption of a vehicle traveling on a selected road segment. The energy consumption estimation may be based on information related to historical energy consumption information for the vehicle, external information that may affect energy consumption by the vehicle, vehicle systems information that may affect energy consumption by the vehicle, and/or selected road segment information that may be used to predict energy consumption by the vehicle.

BACKGROUND

A vehicle expends energy in order to generate the propulsion for moving the vehicle along a route. The energy expended by the vehicle may be considered in terms of energy consumption by the vehicle, wherein the vehicle's energy consumption may be measured in terms of fuel consumption, electric battery consumption, or some combination of the two, as well as other type of energy consumption capable of generating the propulsion for moving the vehicle.

As the demands for efficient energy consumption in vehicles rise, new methods for alerting the driver or other vehicle systems on potential energy conservation options may become important.

SUMMARY

This application is defined by the appended claims. The description summarizes aspects of the embodiments and should not be used to limit the claims. Other implementations are contemplated in accordance with the techniques described herein, as will be apparent upon examination of the following drawings and detailed description, and such implementations are intended to be within the scope of this application.

Exemplary embodiments provide an energy consumption tool for gathering a combination of one or more of historical information, vehicle information, external information, and road segment information to predict energy consumption for a particular vehicle. The energy consumption prediction may be generated for one or more available routes that are identified for reaching a known destination for the particular vehicle. This may allow a driver, or vehicle intelligence, to select one of the available routes, where the selected route may correspond to the route predicted to have the lowest predicted energy consumption.

According to some embodiments, an apparatus for predicting energy consumption of a vehicle is provided. The apparatus may include a memory configured to store energy consumption information for the vehicle, and a processor in communication with the memory. The processor may be configured to receive the energy consumption information, analyze the energy consumption information, and generate an energy consumption profile based on the analysis.

According to some embodiments, a method for predicting energy consumption of a vehicle may be provided. The method may comprise recording, within a memory, historical energy consumption information for the vehicle; receiving, by a processor, the historical energy consumption information and current energy consumption information for the vehicle; analyzing, by the processor, the historical energy consumption information and current energy consumption information, and generating an energy consumption profile based on the analysis.

BRIEF DESCRIPTION OF THE DRAWINGS

For a better understanding of the invention, reference may be made to embodiments shown in the following drawings. The components in the drawings are not necessarily to scale and related elements may be omitted so as to emphasize and clearly illustrate the novel features described herein. In addition, system components can be variously arranged, as known in the art. In the figures, like referenced numerals may refer to like parts throughout the different figures unless otherwise specified.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated. Not all of the depicted components described in this disclosure may be required, however, and some implementations may include additional, different, or fewer components from those expressly described in this disclosure. Variations in the arrangement and type of the components may be made without departing from the spirit or scope of the claims as set forth herein.

With the ongoing emphasis to improve the energy consumption of vehicles, it has become important to inform drivers about specific performance levels for their vehicle, as well as to inform the drivers on how their operating decisions will impact the vehicle's energy consumption. Therefore, it is one of the goals of the innovation described in this disclosure to provide an energy prediction tool for providing an accurate energy consumption profile of the driver's specific vehicle for a selected driving road segment. The energy consumption profile may identify an energy consumption prediction (i.e., estimate) for the vehicle based on one or more of, historical information, vehicle information, road segment information and/or external information. By having the energy prediction tool rely on such information when generating the energy consumption profile, the energy prediction tool may be capable of simply and robustly adapting to driving habits and ambient condition changes to generate new (i.e., updated) energy consumption profiles for the driver's vehicle as the driver is operating the vehicle towards a destination. Further description for the different types of information is provided in more detail below.

According to some goals, the energy prediction tool may be configured to distinguish between a vehicle that was cold started or warm started (e.g., related to temperature of the vehicle's engine block). The energy prediction tool may also be configured to separately predict the energy consumption for vehicle propulsion and non-propulsion functions. The energy prediction tool may also be configured to distinguish between available routes that have different rates of change in their elevation grades.

The energy prediction tool may be a program, application, and/or some combination of software and hardware that is incorporated on one or more of the components that comprise the vehicle's operating system. Further description for the energy prediction tool and the components of the vehicle's vehicle system running the energy prediction tool is described in more detail below.

For traditional petroleum based vehicles, the energy consumption prediction may be generated by the energy prediction tool in terms of an amount of petroleum fuel (e.g., gasoline, diesel fuel) predicted to be consumed in gallons, liters or other amount of measurable fuel usage, and/or in terms of an energy usage amount (e.g., kWh, Joules, or other similar unit of energy usage) by one or more vehicle batteries that are included in the vehicle system. For vehicles that rely, at least in part, on one or more batteries for powering the propulsion of the vehicle, the energy consumption prediction may be generated by the energy prediction tool in terms of amount of battery energy predicted to be consumed in terms of an energy usage amount (e.g., kWh, Joules, or other similar unit of energy usage) by one or more vehicle batteries that are included in the vehicle system. For battery and petroleum fuel hybrid based vehicles, the energy consumption prediction may be generated by the energy prediction tool in terms of an amount of petroleum fuel consumed and an amount of battery energy predicted to be consumed. For alternative fuel based vehicles (e.g., bio-diesel, solar power, liquefied petroleum gas, compressed natural gas, neat ethanol, fuel cells), the energy consumption prediction may be generated by the energy prediction tool in terms of an amount of the alternative fuel predicted to be consumed. It should be noted that is within the scope of the innovation described in this disclosure to apply to any one of the different types of vehicles running on the different energy sources described above, or other vehicle types running on an energy source to be utilized within the foreseeable future.

Figure 1:
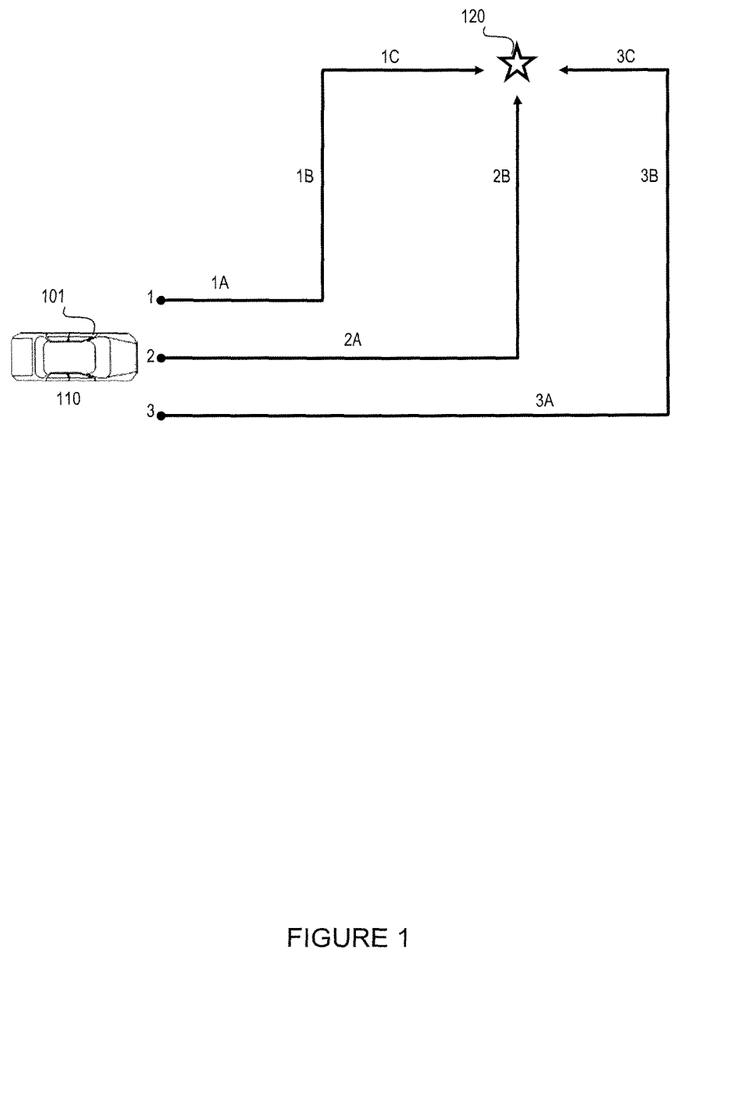
FIG. 1 illustrates an exemplary route planning display according to some embodiments.

The specific road segment for which the energy prediction tool generates an energy consumption profile may correspond to one or more available routes to a desired destination. For example, FIG. 1 illustrates an exemplary route planning display that identifies a vehicle 101 located at a starting location 110, and a destination location 120 representing a location where the driver of the vehicle has determined is a desired destination. In between the starting location 110 and the destination location 120, is a first route 1, second route 2, and a third route 3, where each of the routes represent available driving routes for the vehicle 101 to reach the destination location 120 when starting from the starting location 110.

The first route 1 may be comprised of a first road segment 1A, second road segment 1B, and a road third segment 1C. The second route 2 may be comprised of a first road segment 2A and a second road segment 2B. The third route 3 may be comprised of a first road segment 3A, a second road segment 3B, and a third road segment 3C. Although not specifically illustrated, there may also be another route comprised of a single road segment for reaching the destination location 120. Each road segment may be identified according to a road segment attribute that may include, but not be limited to, a specific road (e.g., part of a same street or road), speed limit (e.g., segment of road having a same speed limit, or a speed limit within a predetermined range), traffic congestion (e.g., a segment of road having a same traffic condition, or a traffic condition within a predetermined range of traffic conditions), road conditions (e.g., a segment of road sharing a same, or similar, road condition such as construction), road segment type (e.g., city road, country road, main road, neighborhood road, gravel road, paved road, concrete road, highway road, toll road), or other detectable road segment attribute.

In some embodiments the starting location 110 may correspond to a current location of the vehicle 101 obtained by the energy prediction tool via driver input, or via location information received from a GPS unit that is part of the vehicle's vehicle system. In some embodiments the starting location 110 may correspond to a location manually input by the driver that may not correspond to an actual current location of the vehicle. As for the destination location 120, the driver may manually input the destination location 120 via an input device that is part of the vehicle system, which will then be received by the energy prediction tool. It follows that the energy prediction tool may generate an energy consumption profile for an entire route (e.g., route 1, route 2, or route 3), for a specific road segment that is less than the entire route (e.g., any one of road segments 1A-1C, 2A-2B, or 3A-3C), and/or for any other measurable portion of a route based on a known attribute of the route. It follows that for the purposes of this disclosure, a road segment may refer to an individual road segment as described above, or to one or more road segments that comprise the entire route from, for example, the starting location 110 to the destination location 120.

The display in FIG. 1 may, for example, correspond to the energy prediction tool running as part of a vehicle navigation system that is part of the vehicle system. The display in FIG. 1 may, for example, alternatively correspond to the energy prediction tool running as an independent application as part of an infotainment component or vehicle navigation component of the vehicle system.

It follows that FIG. 1 displays an exemplary display where a current location 110 and a destination location 120 for the vehicle have been identified and received by the energy prediction tool. FIG. 1 also displays the available routes determined by the energy prediction tool for the vehicle 101 to start from the starting location 110 and reach the destination location 120. From the display of available routes (e.g., route 1, route 2, route 3), the driver may input a selection command to select one of the routes, upon which the energy prediction tool may generate an energy consumption profile for the selected route based on the procedures and methods described herein. Alternatively, in some embodiments the energy prediction tool may generate an energy consumption profile for one or more available routes prior to the driver inputting the selection command. In any case, the energy prediction tool may generate an energy consumption profile for one or more road segments according to the procedures and methods described herein.

Figure 2:
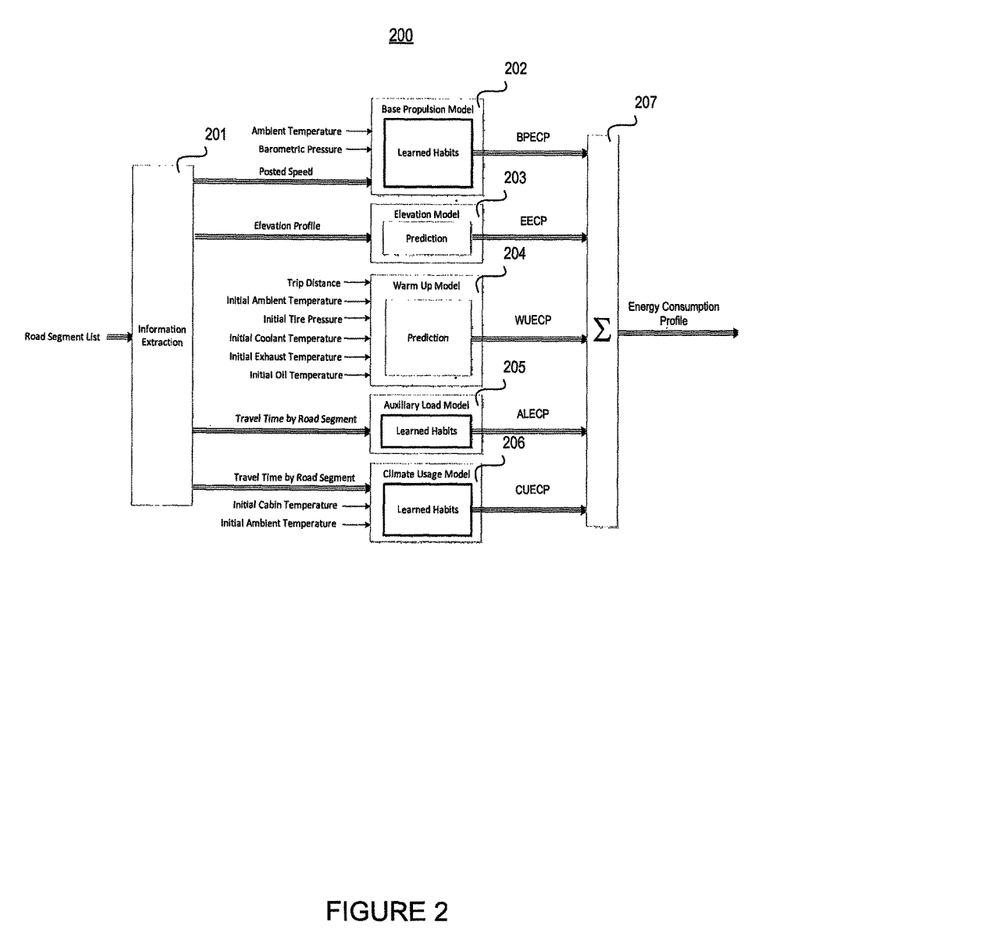
FIG. 2 illustrates an exemplary block diagram describing a process for generating an energy consumption profile according to some embodiments.

FIG. 2 illustrates a block diagram 200 that describes a process, and the information referenced throughout the process, for generating an energy consumption profile for a specified road segment. Each of the components illustrated in FIG. 2 may represent software, hardware, middleware, or some combination thereof that may be included as part of the energy prediction tool for generating the overall energy consumption profile for the vehicle 101.

At 201, the specified road segment is identified from a list of one or more road segments that may comprise a route. For example, the road segments that comprise the list may include entire routes (e.g., route 1, route 2, route 3) or smaller road segments (e.g., any one of road segments 1A-1C, 2A-2B, or 3A-3C). Based on the road segment identified from the list, the energy prediction tool further proceeds to extract road segment information at 201. The road segment information may include, but is not limited to, posted speed limit on the identified road segment, an elevation profile for the identified road segment, current and/or predicted traffic information for the identified road segment, road condition information for the identified road segment, weather information for the identified road segment, or some other identifiable road segment attribute for the identified road segment. The road segment information may be considered external information accessed by the energy prediction tool from a local database (e.g., database stored on a memory of the vehicle system), or accessed by the energy prediction tool from an external source via communication through a network connection.

Figure 3:
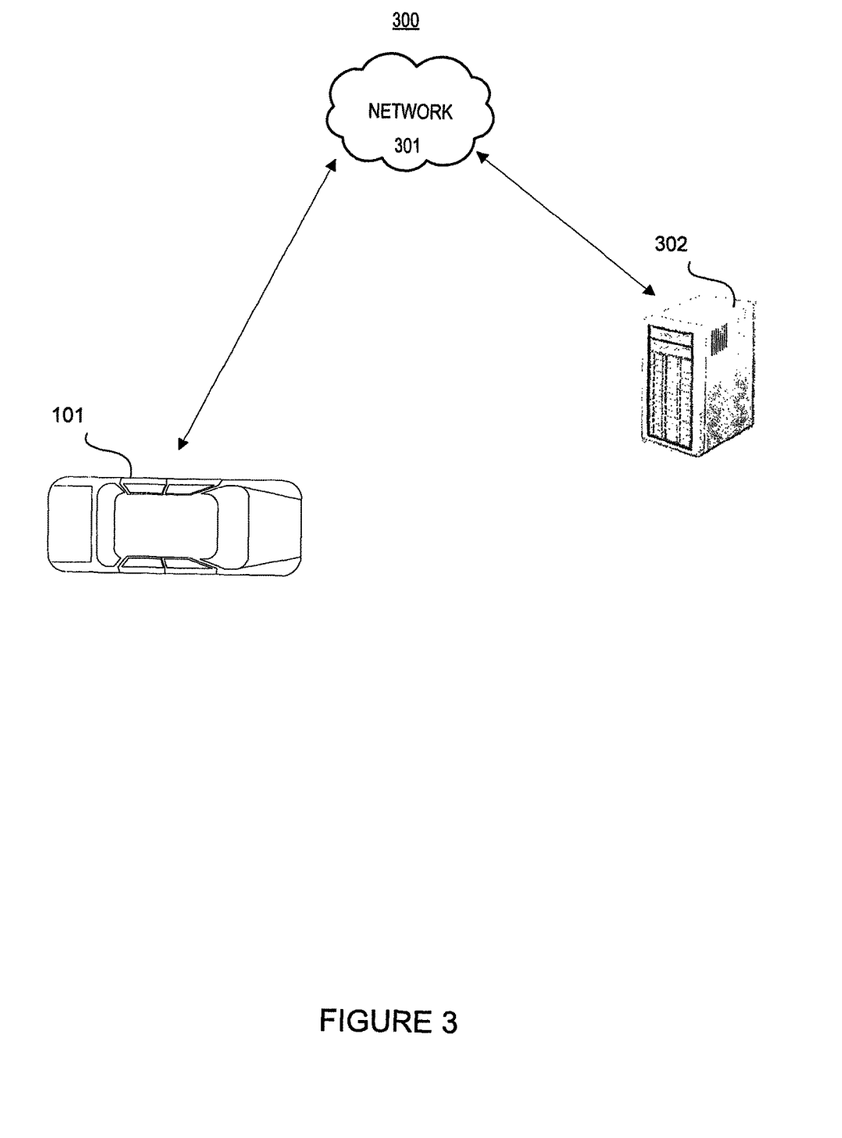
FIG. 3 illustrates an exemplary system for obtaining information according to some embodiments.

For embodiments where the road segment information is obtained from an external source, FIG. 3 illustrates an exemplary network system 300 comprised of the vehicle 101, a network 301, and an information server 302. The information server 302 may represent one or more external servers that store one or more of the road segment information described above. The energy prediction tool may be running on the vehicle 101 such that the energy prediction tool may control a communications interface of the vehicle system to communicate with the information server 302 via the network 301. The energy prediction tool may control a request for the road segment information to be transmitted to the information server 302 via the network 301. In response, the information server 302 may receive the request and transmit, via the network 301, one or more of the requested road segment information back to the vehicle 101 to be received by the communications interface of the vehicle 101. Once the road segment information is received and stored on a storage unit (i.e., memory) of the vehicle system, the energy prediction tool may then extract the road segment information, as illustrated at 201 in FIG. 2.

In addition, the energy prediction tool may reference the road segment information to generate an estimated travel time for the vehicle 101 on the identified road segment. The estimated travel time may be generated by the energy prediction tool based on an analysis of one or more of the information that comprises the road segment information. The estimated travel time may then be considered part of the extracted information at 201.

After extracting the road segment information at 201, the road segment information may be referenced by the energy prediction tool to determine individual energy consumption models. In some embodiments, additional information may also be referenced by the energy prediction tool in determining individual energy consumption models. Further description is provided below.

In terms of the individual models, a base propulsion model 202 may be utilized by the energy prediction tool to generate a base propulsion energy consumption prediction that predicts an amount of energy that may be required to propel the vehicle 101 to traverse the identified road segment at the posted speed limit. The energy prediction tool may determine the base propulsion energy consumption prediction based on, for example, the posted speed limit information included in the road segment information, as well as in some embodiments external information related to ambient temperature and barometric pressure. The external information may be obtained from vehicle sensors that are part of the vehicle system, or alternatively, the external information may be obtained from an information server 302 as described above with reference to the obtainment of the road segment information described herein.

The analysis of the posted speed limit information, ambient temperature information, and barometric pressure information may further be implemented by the energy prediction tool in terms of learned habits of the vehicle 101. It follows that during the course of operation of the vehicle 101, the energy prediction tool may record information that identifies an average energy consumption of the vehicle 101 when traveling in terms of one or more road segment attribute. For example, the energy prediction tool may record the average energy consumption of the vehicle 101 when the vehicle is traveling at a variety of different speeds, and/or traveling along certain road types. The energy prediction tool may then store the average energy consumption information for the vehicle 101 as historical information within a database (e.g., stored on a memory storage unit) of the vehicle system such that the average energy consumption information may be accessed by the energy prediction tool at a later time. Therefore, the database may include historical performance information for the vehicle 101 that describes the average energy consumption for the vehicle 101 at certain speeds, or ranges of speeds. The database may, for example, be configured to be a look-up table comprised of speeds, and/or ranges of speeds, matched up to their corresponding historical average energy consumptions for the vehicle 101. It follows that the energy prediction tool may access this database in order to look up historical average energy consumptions for the vehicle 101 at particular speeds in order to use as the base propulsion energy consumption prediction in the base propulsion model 202.

In some embodiments, the energy prediction tool may determine the base propulsion energy consumption prediction based on the historical information described above, and then further apply modifications to the base propulsion energy consumption prediction to account for the predicted effects of ambient temperature and barometric pressure on energy consumption. The modifications to the base propulsion energy consumption prediction obtained from the historical information database may be made in view of the specific ambient temperature information and barometric pressure information obtained by the base propulsion model 202.

After analyzing the information as described above, the energy prediction tool may utilize the base propulsion model 202 to generate the based propulsion energy consumption prediction (BPECP) illustrated as resulting out of the base propulsion model 202.

The elevation model 203 is another exemplary model that may be utilized by the energy prediction tool. Specifically, the elevation model 203 may be utilized by the energy prediction tool to determine an elevation energy consumption prediction that predicts the potential energy consumed and gained by the vehicle 101 as the vehicle travels up and down different heights while traversing the identified road segment. The potential energy information as well as information identifying the elevation of the identified road segment may be received within an elevation profile from the extracted road segment information at 201. In some embodiments, the elevation energy consumption prediction may also take into consideration the effects of regenerative braking systems on the vehicle 101 that may be able to recoup some of the energy consumption. The energy prediction tool may analyze the information included in the elevation profile, and in some embodiments the effects of regenerative braking, by plugging such information into a predetermined formula for generating the elevation energy consumption prediction. The predetermined formula may consider, for example, the mass of vehicle 101, acceleration due to gravity, and the elevation information for the identified road segment.

Based on the analysis of the elevation profile information, and in some embodiments the effects of regenerative braking, the energy prediction tool may utilize the elevation model 203 to generate the elevation energy consumption prediction (EECP) illustrated as resulting out of the elevation model 203.

The warm up model 204 is another exemplary model that may be utilized by the energy prediction tool. Specifically, the warm up model 204 may be utilized by the energy prediction tool to determine a warm up energy consumption prediction that predicts the amount of energy consumed to start up the vehicle 101. For example, the warm up energy consumption prediction may correspond to a prediction of the additional energy consumed during the warm up period for the vehicle 101 due to factors including increased oil viscosity and catalyst light off. Some of the factors received by the warm up model 204 for determining the warm up energy consumption prediction may include, but not be limited to, trip distance information (i.e., road length information), initial ambient temperature information, initial tire pressure information, initial coolant temperature information, initial exhaust temperature information, and initial oil temperature information. The trip distance information corresponds to a distance traveled by the vehicle 101 since start up of the vehicle 101, wherein the trip distance information may, for example, be obtained via driver input or reference to a distance measuring component (e.g., odometer) of the vehicle system. The initial ambient temperature may, for example, be obtained from vehicle sensors included within the vehicle system, or alternatively, the initial ambient temperature may be obtained from an external information server 302, as described above. The initial tire pressure information may, for example, be obtained from one or more tire pressure monitors included within one or more of the wheels included in the vehicle system. The initial coolant temperature may, for example, be obtained from one or more temperature sensors included as part of the vehicle system. The initial exhaust temperature may, for example, be obtained from one or more temperature sensors included as part of the vehicle system. The initial oil temperature may, for example, be obtained from one or more temperature sensors included as part of the vehicle system.

By analyzing a combination of one or more of the input information received into the warm up model 204, the energy prediction tool may utilize the warm up model 204 to generate the warm up energy consumption prediction (WUECP) illustrated as resulting out of the warm up model 204.

The auxiliary load model 205 is another exemplary model that may be utilized by the energy prediction tool. Specifically, the auxiliary load model 205 may be utilized by the energy prediction tool to determine an auxiliary energy consumption prediction that predicts an amount of energy required for the vehicle 101 to run various auxiliary loads during the course of traversing the identified road segment. The auxiliary loads may correspond to, but are not limited to, alternator loads or DC-to-DC converter loads resulting from headlights, interior lighting, audio system, infotainment system, speaker system, heated seats, solenoid valves, electric fans, vehicle control modules, sensors, climate blower fans, or other vehicle components that rely on a vehicle energy source (e.g., 12 Volt battery) to function. The auxiliary loads considered by the auxiliary load model 205 may correspond to one or more of the auxiliary loads the energy prediction tool knows is currently running on the vehicle 101, one or more of the auxiliary loads the energy prediction tool predicts will be running on the vehicle 101 during the course of traveling the identified road segment, or some combination of the two. The prediction of an auxiliary load may correspond to multiplying a distance or time the auxiliary load is predicted by the energy prediction tool to be running during the course of the identified road segment, and a known average energy consumption for the auxiliary load.

The auxiliary load model 205 may further utilize learned habits of the vehicle 101 in determining the auxiliary energy consumption prediction. For example, during the course of operation of the vehicle 101, the energy prediction tool may detect information identifying average energy consumption for powering one or more of the auxiliary loads described herein or otherwise known or capable of running on the vehicle 101. The energy prediction tool may then store the average energy consumption information related to the powering of the auxiliary loads as historical information within a database (e.g., stored on a memory storage unit) of the vehicle system such that the average energy consumption information may be accessed by the energy prediction tool at a later time. Therefore, such a database may include historical performance information for powering one or more of the vehicle components considered to be an auxiliary load on the vehicle 101. It follows that the energy prediction tool may access this database in order to look up historical average energy consumptions for one or more auxiliary loads known or predicted by the auxiliary load model 205 to be running during the course of traveling the identified road segment.

As illustrated, the auxiliary load model 205 receives the estimated travel time on the identified road segment information from 201. By then multiplying the estimated travel time to each of the historical average energy consumptions for the one or more auxiliary loads known or predicted to be running on the vehicle 101 while traversing the identified road segment, the energy prediction tool may obtain predicted energy consumption values for each of the auxiliary loads known or predicted to be running on the vehicle 101 while traversing the identified road segment. By summing each of these predicted energy consumption values, the energy prediction tool may utilize the auxiliary load model 205 to generate the auxiliary load energy consumption prediction (ALECP) illustrated as resulting out of the auxiliary load model 205.

The climate usage model 206 is another exemplary model that may be utilized by the energy prediction tool. Specifically, the climate usage model 206 may be utilized by the energy prediction tool to determine a climate usage energy consumption prediction for the vehicle 101 that relates to energy consumed by energy sources (e.g., battery or fuel) of the vehicle 101 to maintain climate control levels within the vehicle 101 while it traverses the identified road segment. For example, the climate usage model 206 may predict the amount of energy required to reach the vehicle cabin temperature set by a climate control system of the vehicle 101.

The climate usage model 206 may further utilize learned habits of the vehicle 101 in determining the climate usage energy consumption prediction. For example, during the course of operation of the vehicle 101, the energy prediction tool may detect information identifying average energy consumption for powering the vehicle 101's climate control system in order to maintain the vehicle cabin at one or more set temperatures. In some embodiments, the energy prediction tool may further take into account the outside temperature in comparison to the set vehicle cabin temperature when tracking the average energy consumption. The energy prediction tool may then store the average energy consumption information related to the powering of the climate control system as historical information within a database (e.g., stored on a memory storage unit) of the vehicle system such that the average energy consumption information may be accessed by the energy prediction tool at a later time. Therefore, such a database may include historical performance information for powering the climate control system at certain known set temperatures for maintaining the vehicle cabin. It follows that the energy prediction tool may access this database in order to look up historical average energy consumptions for known set vehicle cabin temperatures.

In some embodiments, the energy prediction tool may optionally consider whether one or more windows or sunroofs are in an up or down state to modify the historical average energy consumption information obtained from the database. For example, opened windows and/or sunroofs increase the predicted average energy consumption because the climate control systems may need to work harder to maintain the set vehicle cabin temperature.

As illustrated, the climate usage model 206 receives the estimated travel time on the identified road segment information from 201. By then multiplying the estimated travel time to the historical average energy consumption information obtained from the database described above, the energy prediction tool may obtain the climate usage energy consumption prediction. As illustrated in FIG. 2, the climate usage model 206 may also receive initial cabin temperature information and initial ambient temperature information. The initial cabin temperature information and initial ambient temperature information may then be considered by the climate usage model 206 to modify the climate usage energy consumption prediction based on the historical average energy consumption information obtained from the database. For example, the further away the initial cabin temperature and/or the initial ambient temperature is from the vehicle cabin temperature currently set into the climate control system of the vehicle 101, the more predicted energy may be added by the energy prediction tool to the energy consumption climate usage energy consumption prediction.

In some embodiments, the energy prediction tool may optionally apply a saturation compensation to ensure the climate usage energy consumption prediction does not exceed a capability of the vehicle's climate control system.

In this way, the energy prediction tool may utilize the climate usage model 206 to generate the climate usage energy consumption prediction (CUECP) illustrated as resulting out of the climate usage model 206.

It should be noted that each of the energy consumption predictions (BPECP, EECP, WUECP, ALECP, CUECP) may have incorporated an effective energy conversion efficiency associated with converting the source energy (e.g., fuel energy or battery energy) in a usable form such as mechanical energy to propel the vehicle or the electrical energy for the vehicle's 12V battery to produce the energy to power one or more of the vehicle's auxiliary loads.

After generating the energy consumption predictions from one or more of the base propulsion model 202, elevation model 203, warm up model 204, auxiliary load model 205, and climate usage model 206, at 207 the energy prediction tool may sum one or more (all in a preferred embodiment) of the generated energy consumption predictions to generate the energy consumption profile for the vehicle 101 traversing the identified road segment. The energy consumption profile may identify predicted energy consumption for the vehicle 101 as the vehicle 101 traverses the identified road segment based on the historical information, vehicle information, and external information described in detail above.

It should be noted that the average energy consumption values described above based on the historical information may be average steady state energy consumption values. Further, the vehicle 101 may come preloaded with some baseline energy consumption estimates based on testing scenarios for a test vehicle that is the same, or at least similar, vehicle model as vehicle 101. The testing scenarios may correspond to detecting the energy consumption for the test vehicle under a variety of energy consuming operations such as driving the test vehicle at various speeds, driving the test vehicle under various loads, driving the test vehicle under various initial conditions, and driving the test vehicle under various external conditions. Some examples for the different scenarios for operating the vehicle are provided throughout this disclosure, however other scenarios are also within the scope of the innovation described herein. Then based on the different testing scenarios, energy consumption predictions may be obtained for the test vehicle operating under the various scenarios. The energy consumption predictions may then be stored as part of a database that may be preloaded onto a memory that is part of the vehicle system. It follows that this preloaded database may be referenced, analyzed, and utilized when generating the energy consumption profile according to any one or more of the processes described herein.

Although the above description was provided in terms of a road segment that is part of a route from a starting location 110 to a destination location 120, it is also within the scope of the present disclosure for the energy prediction tool to provide an energy consumption profile for any identifiable road segment. In other words, the energy prediction tool may provide an energy consumption profile for a road segment having known road segment attributes as described herein. For example, the energy prediction tool may provide an energy consumption profile during the operation of the vehicle, where the energy consumption profile is for a road segment the energy prediction tool knows, or predicts, the vehicle 101 will be traveling for at least a set distance.

Figure 4:
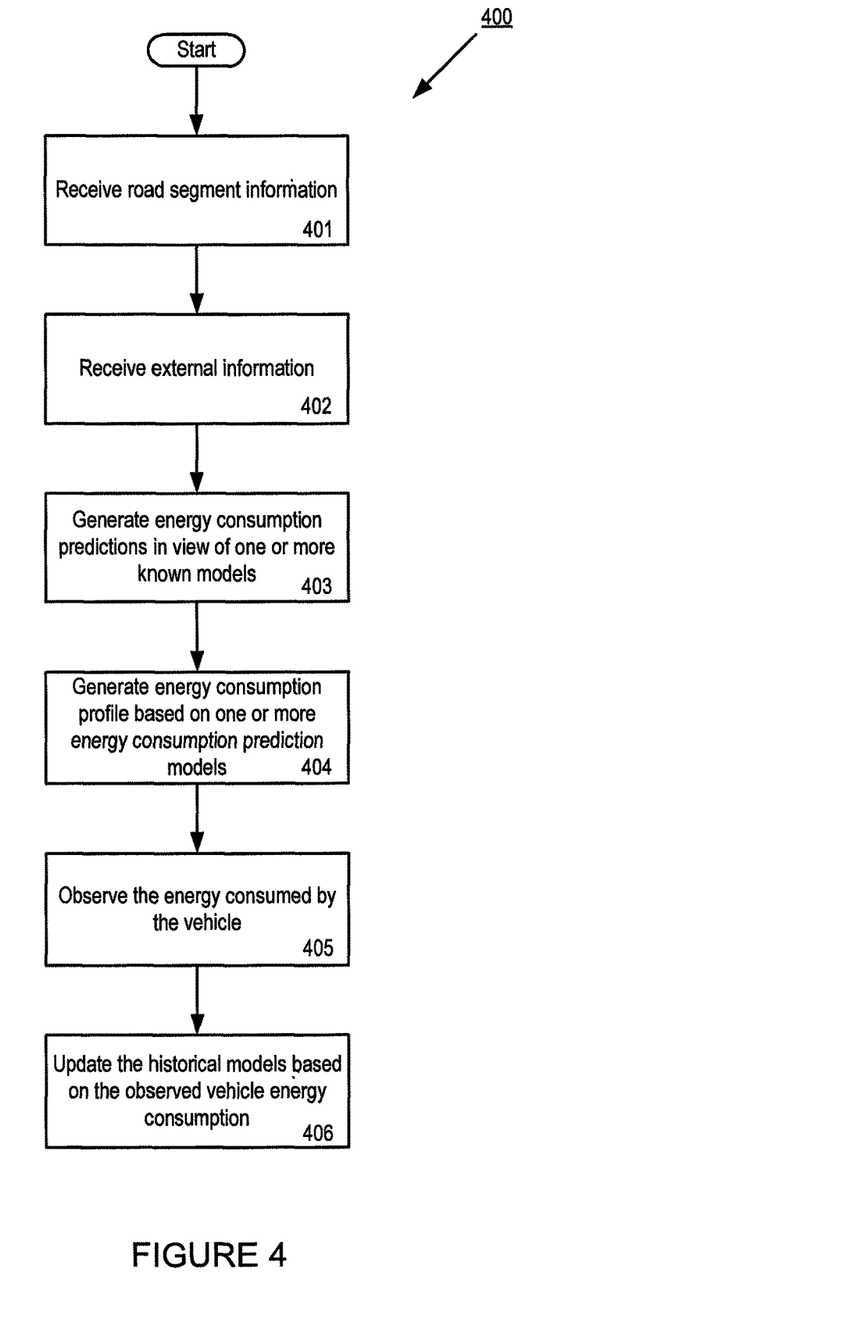
FIG. 4 illustrates an exemplary flow chart describing a process according to some embodiments.

FIG. 4 illustrates an exemplary flow chart 400 describing a process for the energy prediction tool according to some embodiments. The process described by flow chart 400 describes exemplary steps that may be implemented by the energy prediction tool for generating the energy consumption profile for the specific vehicle 101. The steps of the process described below is provided for exemplary purposes, as it is within the scope of this disclosure for the energy prediction tool to implement a greater, or fewer, number of steps in order to generate the energy consumption profile. Further description is now provided describing the flow chart 400.

At 401, the energy prediction tool may receive road segment information for the vehicle 101 according to any one or more of the processes described herein. For example, the energy prediction tool may receive the road segment information as described above corresponding to the road segment information extracted at 201 in the block diagram 200.

At 402, the energy prediction tool may additionally receive external information according to any one or more of the processes described herein. For example, the energy prediction tool may receive any one or more of the external information (e.g., ambient temperature, barometric pressure, trip distance, initial ambient temperature, initial tire pressure, initial coolant temperature, initial exhaust temperature, initial oil temperature, initial cabin temperature, GPS location data, real-time traffic data, route segment condition data) described above as being obtained by one or more components of the vehicle system and received by the energy prediction tool.

At 403, the energy prediction tool may generate one or more energy consumption predictions in view of any one or more of the models described herein. For example, the energy prediction tool may generate energy consumption predictions in view of any one or more of the base propulsion model 202, elevation model 203, warm up model 204, auxiliary load model 205, or climate usage model 206 as described above with reference to the block diagram 200.

Then, at 404 the energy prediction tool may generate the energy consumption profile based on the summation of one or more of the energy consumption predictions generated at 403. The energy consumption profile may include, for example, information identifying a predicted energy consumption for the vehicle traversing the road segment identified from the road segment information.

At 405, after the generation of the energy consumption profile(s), the energy prediction tool may observe the energy consumed by the vehicle. This observation by the energy prediction tool allows the energy prediction tool to obtain and gather the actual energy consumed by the various vehicle systems, components, and models.

Then at 406, the energy prediction tool may update its historical models based on the actual energy consumptions observed by the energy prediction tool at 405.

The historical models managed by the energy prediction tool allow the energy prediction tool to modify its prediction algorithm to better match the observed real world energy consumptions of the particular vehicle. The energy prediction tool may monitor the observed energy consumption in units of gallons or watt-hours and directly correct the system models to ensure that the model outputs (which are in the same units) agree. For example, consider a case where a warmed up vehicle is driven on a flat stretch of highway with the climate control system turned off. The energy prediction tool originally estimates that the vehicle will consume fuel at a rate of 0.03 gallons per mile for propulsion (BPECP) and 0.002 gallons of fuel per mile for the auxiliary system (ALECP). If the vehicle actually consumes fuel at a rate of 0.035 gallons per mile (0.033 for propulsion and 0.002 for auxiliary), then the system will observe these real world energy consumption rates and adapt the propulsion model over time until the system accurately predicts 0.033 gallons of fuel per mile consumption.

It should be noted that the process described by flow chart 200 is provided for exemplary purposes, as it is within the scope of the innovation described by the disclosure provided herein to include a fewer, or greater, number of steps.

Figure 5:
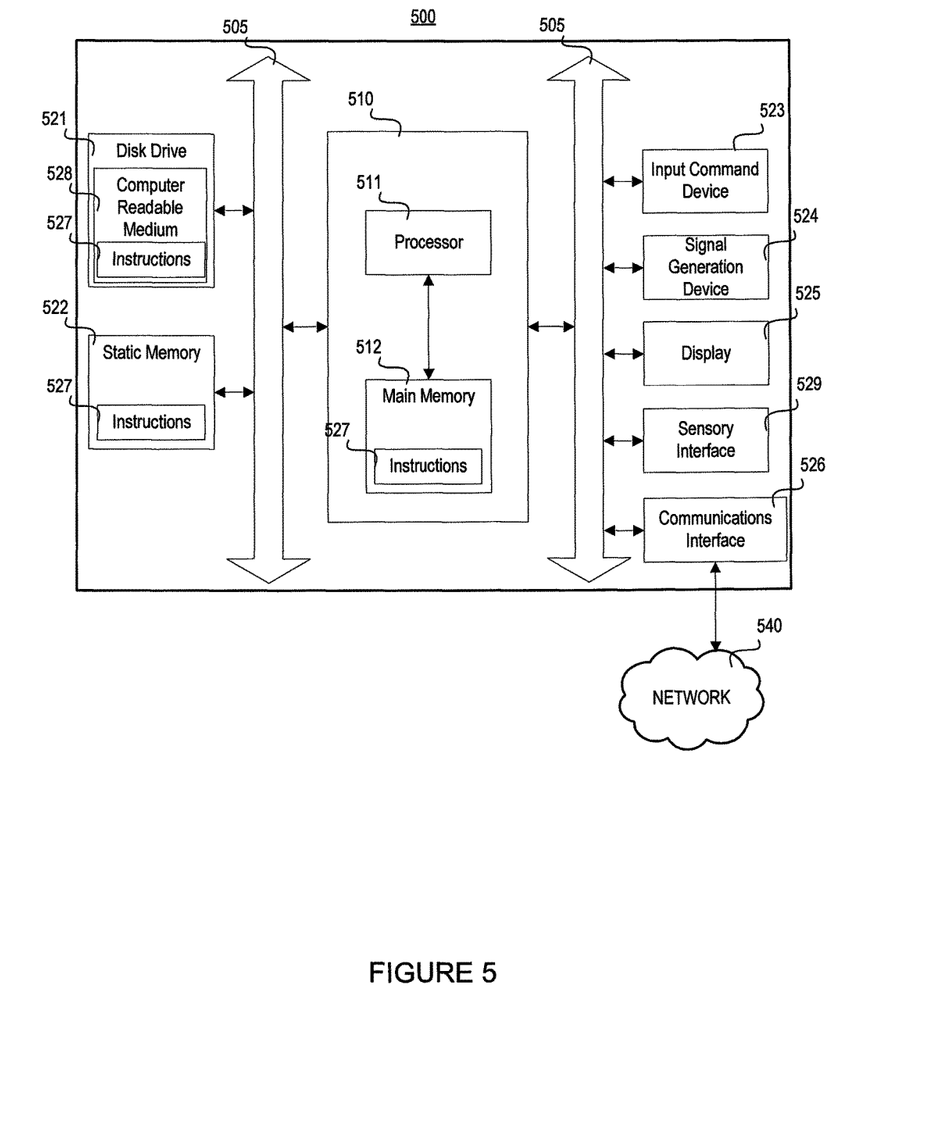
FIG. 5 illustrates an exemplary block diagram for a computing system that may be part of a vehicle system according to some embodiments.

Referring to FIG. 5, an illustrative embodiment of a computing system 500 that may be used for one or more of the devices shown in FIG. 3, or in any other system configured to carry out any one or more of the methods, features, and processes discussed herein, is shown and designated by the computing system 500. For example, the functional components of the vehicle 101 needed to implement the energy prediction tool may be implemented as the computer system 500. Also, the information server 302 illustrated in FIG. 3 may be implemented as the computing system 500.

The computing system 500 may include a processing unit 510 comprised of a processor 511 in communication with a main memory 512, wherein the main memory 512 stores a set of instructions 527 that may be executed by the processor 511 to cause the computing system 500 to perform any one or more of the methods, processes or computer-based functions disclosed herein. For example, the energy prediction tool described throughout this disclosure may be a program that is comprised of a set of instructions 527 that are executed to perform any one or more of the methods, processes or computer-based functions described herein such as the processes for generating the energy consumption profile for the vehicle 101. The computing system 500 may be mobile or non-mobile, operate as a stand-alone device, or may be connected using a network, to other computer systems or peripheral devices.

In a networked deployment, the computing system 500 may operate in the capacity of a server or as a client user computer within a vehicle in a server-client user network environment, or as a peer computer system within a vehicle in a peer-to-peer (or distributed) network environment. In addition to being a component within the vehicle system, the energy prediction tool may also be run on the computing system 500 that is implemented as, or incorporated into, various devices, such as a personal computer ("PC"), a tablet PC, a set-top box ("STB"), a personal digital assistant ("PDA"), a mobile device such as a smart phone or tablet, a palmtop computer, a laptop computer, a desktop computer, a network router, switch or bridge, or any other machine capable of executing a set of instructions (sequential or otherwise) that specify actions to be taken by that machine. In a particular embodiment, the computing system 500 can be implemented using electronic devices that provide voice, video or data communication. Further, while a single computing system 500 is illustrated, the term "system" shall also be taken to include any collection of systems or sub-systems that individually or jointly execute a set, or multiple sets, of instructions to perform one or more computer functions.

As illustrated in FIG. 5, the computing system 500 may include the processor 511, such as a central processing unit ("CPU"), a graphics processing unit ("GPU"), or both. Moreover, the computing system 500 can include the main memory 512 and a static memory 522 that can communicate with each other via a bus 505. As shown, the computing system 500 may further include a display unit 525, such as a liquid crystal display ("LCD"), an organic light emitting diode ("OLED"), a flat panel display, a solid state display, or a cathode ray tube ("CRT"). The display unit 525 may correspond to a display component of a navigation system, vehicle infotainment system, a heads-up display, or instrument panel of the vehicle 101. Additionally, the computing system 500 may include one or more input command devices 523, such as a control knob, instrument panel, keyboard, scanner, digital camera for image capture and/or visual command recognition, touch screen or audio input device, buttons, a mouse or touchpad. The computing system 500 can also include a disk drive unit 521 for receiving a computer readable medium 528. In a particular embodiment, the disk drive unit 521 may receive the computer-readable medium 528 in which one or more sets of instructions 527, such as the software corresponding to the energy prediction tool, can be embedded. Further, the instructions 527 may embody one or more of the methods or logic as described herein. In a particular embodiment, the instructions 527 may reside completely, or at least partially, within any one or more of the main memory 512, the static memory 522, computer readable medium 528, and/or within the processor 511 during execution of the instructions 527 by the processor 511.

The computing system 500 may also include a signal generation device 524, such as a speaker or remote control, and a sensory interface 529. The sensory interface 529 may be configured to receive information obtained by one or more sensors that are part of the vehicle system. For example, the vehicle system may include one or more temperature sensors located at various locations within the vehicle system for obtaining sensory reading information on engine fluid temperature, exhaust component and/or exhaust fume temperature, ambient temperature, engine block temperature, cabin temperature, barometric pressure, tire pressure, or vehicle speed. In some embodiments, the sensory interface 529 may also receive information identifying the state of certain vehicle components such as the state of window positions, sunroof positions, throttle positions, and other detectable states for vehicle system components.

The computing system 500 may further include a communications interface 526. The communications interface 526 may be comprised of a network interface (either wired or wireless) for communication with an external network 540. The external network 540 may be a collection of one or more networks, including standards-based networks (e.g., 2G, 3G, 4G, Universal Mobile Telecommunications System (UMTS), GSM (R) Association, Long Term Evolution (LTE) (TM), or more), WiMAX, Bluetooth, near field communication (NFC), WiFi (including 802.11 a/b/g/n/ac or others), WiGig, Global Positioning System (GPS) networks, and others available at the time of the filing of this application or that may be developed in the future. Further, the external network 540 may be a public network, such as the Internet, a private network, such as an intranet, or combinations thereof, and may utilize a variety of networking protocols now available or later developed including, but not limited to TCP/IP based networking protocols. For example, the external network 540 may correspond to the same network 301 described with reference to FIG. 3.

In some embodiments the program that embodies the energy prediction tool may be downloaded and stored on any one or more of the main memory 512, computer readable medium 528, or static memory 522 via transmission through the network 540 from an off-site server. Further, in some embodiments the energy prediction tool running on the computing system 500 may communicate with an information server via the network 540. For example, the energy prediction tool may communicate with the information server 302 via network 540 in order to receive any one or more of the external information described herein through the communication interface 526.

In an alternative embodiment, dedicated hardware implementations, including application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by the computing system 500. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories, such as flash memory. Further, the computer-readable medium can be a random access memory or other volatile re-writable memory. Additionally, the computer-readable medium can include a magneto-optical or optical medium, such as a disk or tapes or other storage device to capture information communicated over a transmission medium. Accordingly, the disclosure is considered to include any one or more of a computer-readable medium or a distribution medium and other equivalents and successor media, in which data or instructions may be stored.

Any process descriptions or blocks in the figures, should be understood as representing modules, segments, or portions of code which include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

What is claimed is:

1. A vehicle, comprising:
   a display
   a climate control; and
   an apparatus for predicting energy consumption of the vehicle comprising:
   a memory configured to store energy consumption information for the vehicle; and
   a processor in communication with the memory, the processor configured to:

receive the energy consumption information;
analyze the energy consumption information;
generate an energy consumption profile based on the analysis of the energy consumption information;
receive a route, desired cabin temperature, current outside temperature, and vehicle window states;
estimate travel time along the received route;
load an historical climate control energy consumption (HCCEC) based on the desired cabin temperature and current outside temperature;
estimate route climate control energy consumption based on received vehicle window states, the loaded historical climate control energy consumption, and the estimated travel time;
estimate total route energy consumption based in part on the estimated route climate control energy consumption; and
display the total route energy consumption.

2. The vehicle of claim 1, wherein the processor is further configured to:
estimate a warmup energy consumption based on measured ambient and coolant temperatures; and
estimate the total route energy consumption based in part on the estimated warmup energy consumption.

3. The vehicle of claim 2, wherein the processor is further configured to:
estimate the warmup energy consumption based on measured tire pressures.

4. The vehicle of claim 1, wherein the processor is further configured to:
estimate the route climate control energy consumption based in part on a current cabin temperature.

5. The vehicle of claim 1, wherein the processor is further configured to:
load the (HCCEC) based on the desired cabin and current outside temperatures by at least:
accessing a database storing a plurality of HCCECs, each of the stored HCCECs being associated with a reference desired cabin temperature and a reference current outdoor temperature;
selecting one of the HCCECs based on a comparison of the desired cabin and current outdoor temperatures to the reference desired cabin temperatures and the reference current outdoor temperatures; and
loading the selected HCCEC.

6. The vehicle of claim 1, wherein the processor is further configured to:
load the HCCEC from a database storing a plurality of different HCCECs;
determine an actual climate control maintenance energy consumption along the route, the climate control maintenance energy consumption being an energy consumption needed to maintain cabin temperature at the desired cabin temperature;
update at least one of the plurality of different HCCECs stored in the database based on the determined actual climate control maintenance energy consumption.

7. The vehicle of claim 1, wherein the processor is further configured to:
estimate the route climate control energy consumption by at least: (a) estimating a climate control maintenance energy consumption based on the HCCEC and the estimated travel time, (b) modifying (a) based on an initial cabin temperature, and (c) setting the modified energy consumption as the estimated route climate control energy consumption.

8. The vehicle of claim 7, wherein the processor is further configured to: modify the estimated climate control maintenance energy consumption based on a state of at least one vehicle window.

9. The vehicle of claim 7, wherein the processor is further configured to:
cap the estimated route climate control energy consumption according to a preset maximum energy consumption capability of the climate control.

10. The vehicle of claim 1, wherein the loaded HCCEC accounts for energy consumed to maintain cabin temperature at the desired cabin temperature, but does not account for energy consumed to bring a current cabin temperature to the desired cabin temperature.

11. The vehicle of claim 1, wherein the vehicle is a hybrid vehicle comprising:
a wheel, a combustion engine configured to power the wheel, a battery configured to power the wheel, and a hybrid regeneration system configured to charge the battery with energy recovered from braking the wheel.

12. The vehicle of claim 11, wherein the processor is further configured to:
break the received route into segments;
estimate an elevation energy consumption for each segment based on (i) a received elevation profile of the segment and (ii) an estimated energy recovery by the hybrid regeneration system during the segment;
wherein the estimated energy recovery during the segment is based on the received elevation profile of the segment.

13. The vehicle of claim 12, wherein the processor is further configured to:
break the received route into segments based on received traffic conditions along the route.

14. A vehicle comprising:
a display, climate control (CC), and processor for:
receiving a route, desired cabin and current outside temperatures, and window states;
estimating travel time along the route;
loading an historical CC energy consumption (HCCEC) based on the temperatures;
estimating route CC energy consumption based on the HCCEC, travel time, and window states;
estimating total route energy consumption based in part on the route CC energy consumption; and
displaying the total route energy consumption.

15. The vehicle of claim 14, wherein the processor is further provided for:
loading the HCCEC from a database storing a plurality of different HCCECs;
determining an actual climate control maintenance energy consumption along the route, the climate control maintenance energy consumption being an energy consumption needed to maintain cabin temperature at the desired cabin temperature;
updating at least one of the plurality of different HCCECs stored in the database based on the determined actual climate control maintenance energy consumption.

16. The vehicle of claim 14, wherein the processor is further provided for:
estimating the route climate control energy consumption by at least: (a) estimating a climate control maintenance energy consumption based on the HCCEC and the estimated travel time, (b) modifying (a) based on an initial cabin temperature and a detected state of at least one vehicle window, (c) setting the modified energy consumption as the estimated route climate control energy consumption.

17. The vehicle of claim 16, wherein the loaded HCCEC accounts for energy consumed to maintain cabin temperature at the desired cabin temperature, but does not account for energy consumed to bring a current cabin temperature to the desired cabin temperature.

* * * * *